W. S. ADAMS.
BRAKE MECHANISM.
APPLICATION FILED MAY 5, 1913.
1,176,263.
Patented Mar. 21, 1916.
5 SHEETS—SHEET 4.
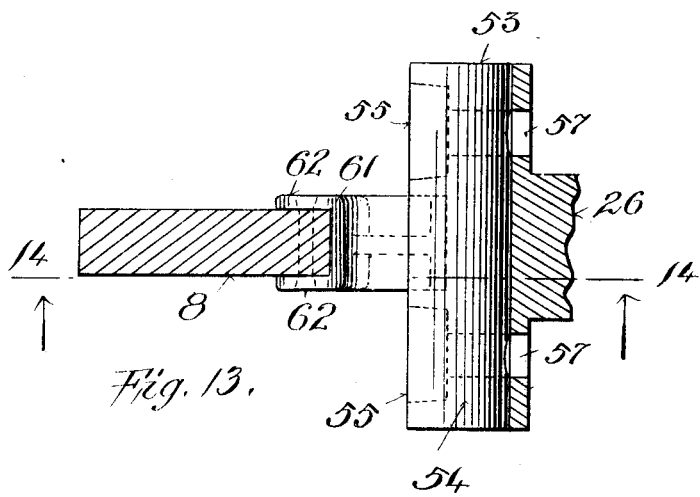
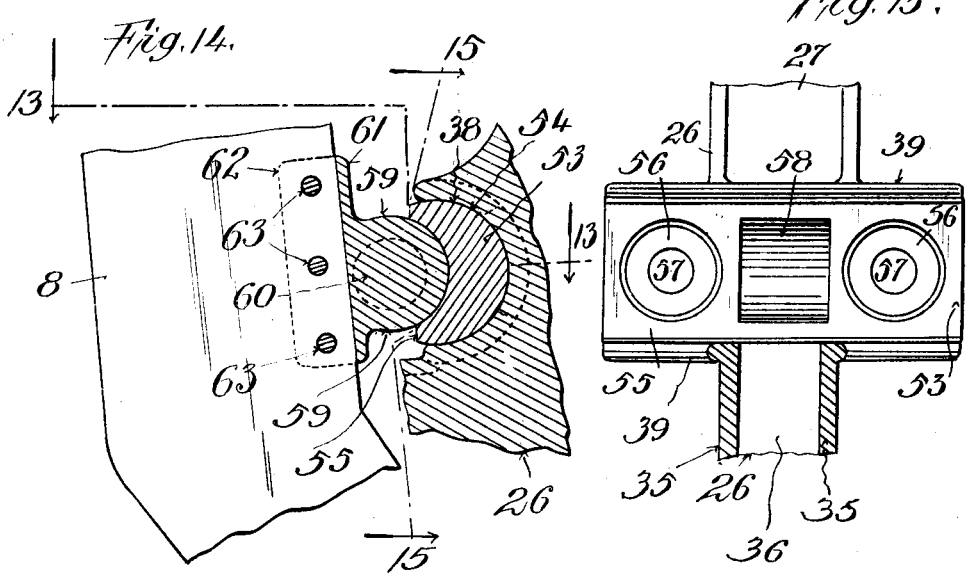
Witnesses:
Inventor
Walter S. Adams.
By his Attorney

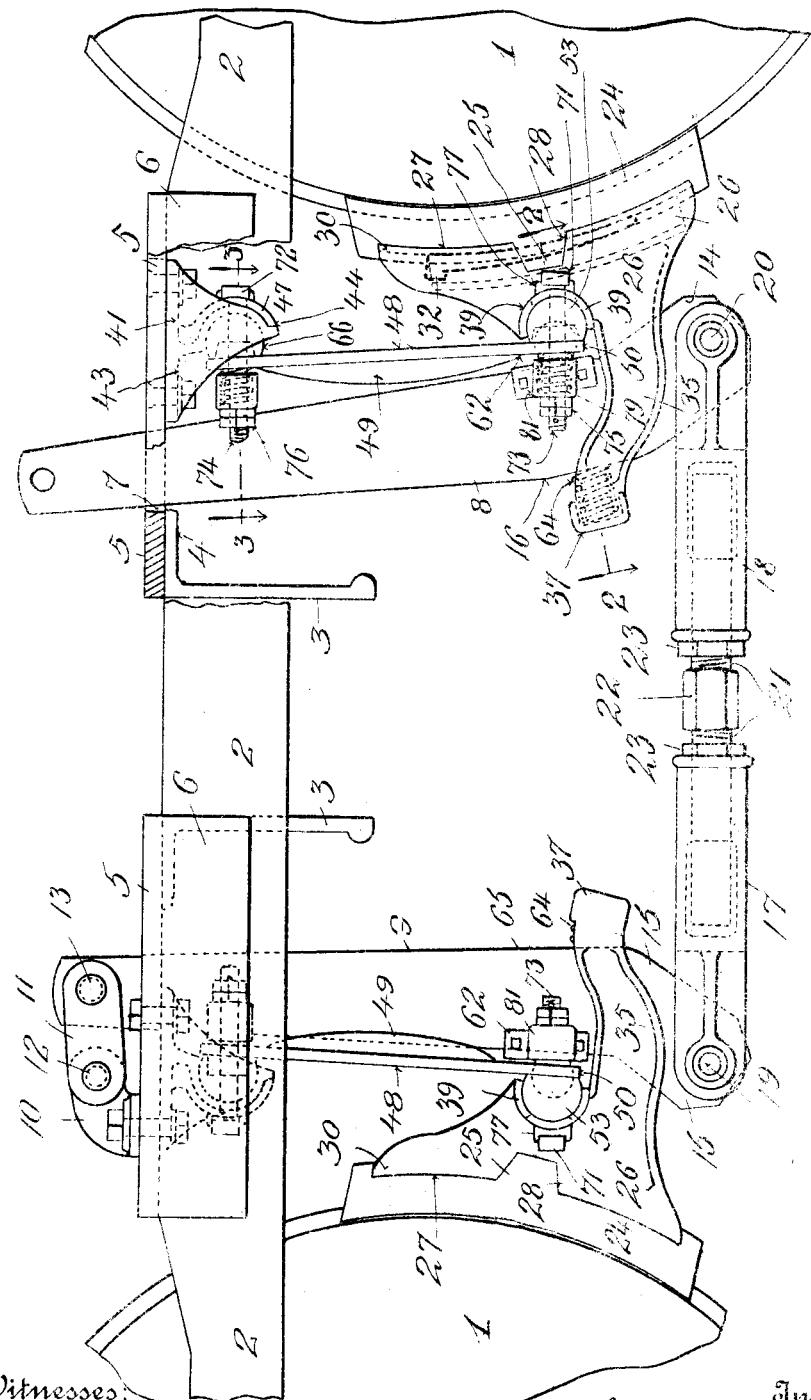
W. S. ADAMS.
BRAKE MECHANISM.
APPLICATION FILED MAY 5, 1913.
1,176,263.
Patented Mar. 21, 1916.
5 SHEETS—SHEET 1.

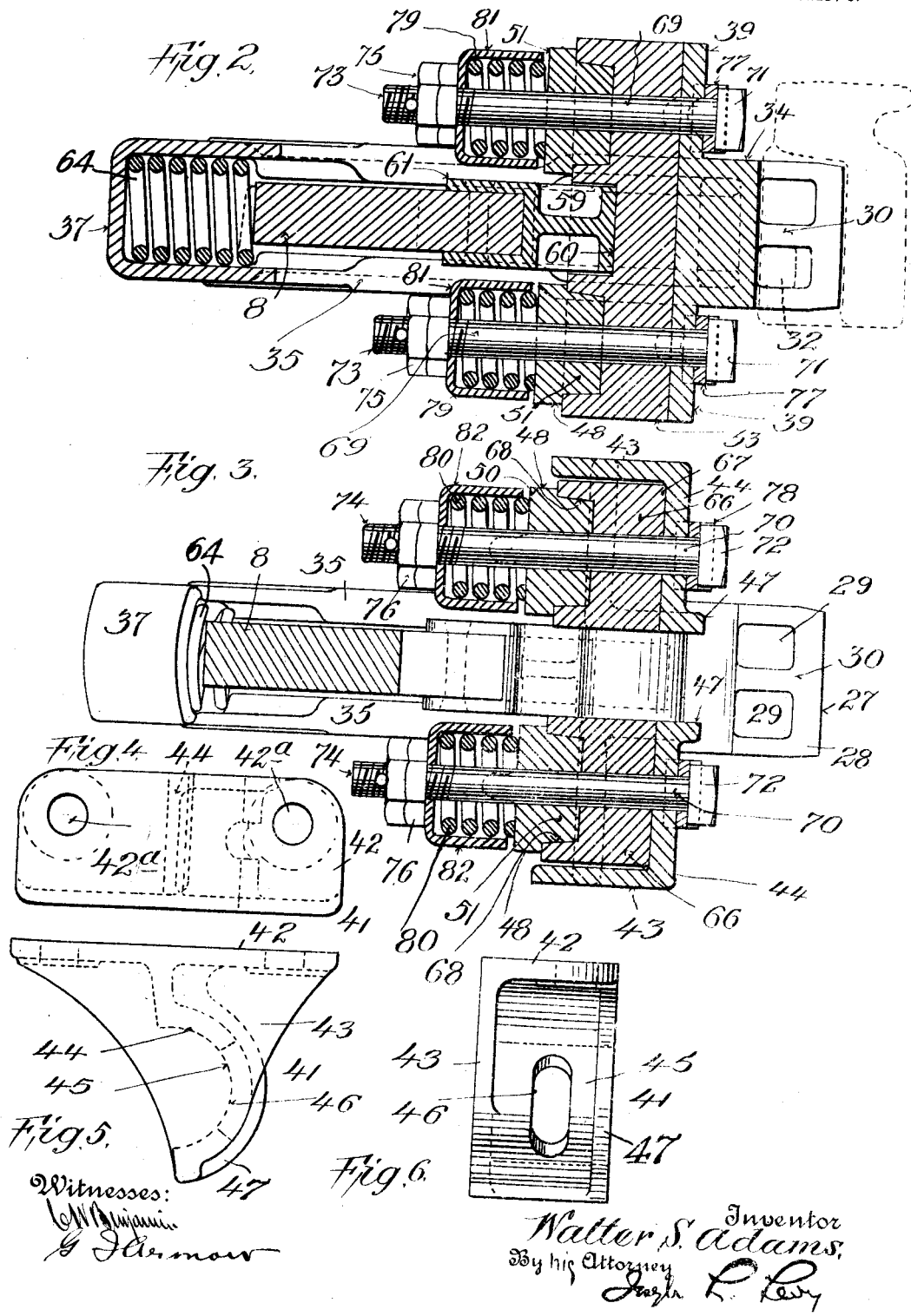

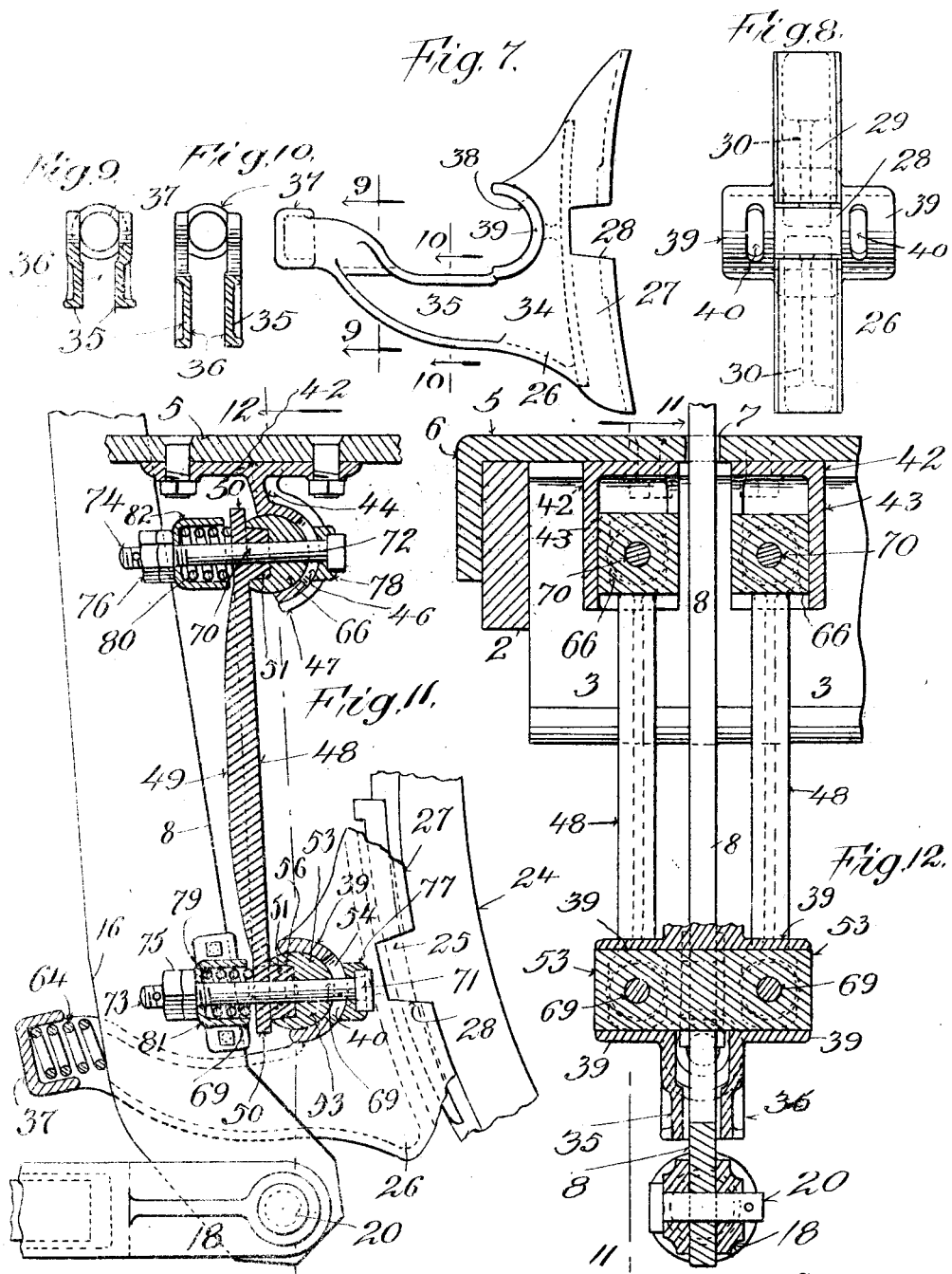

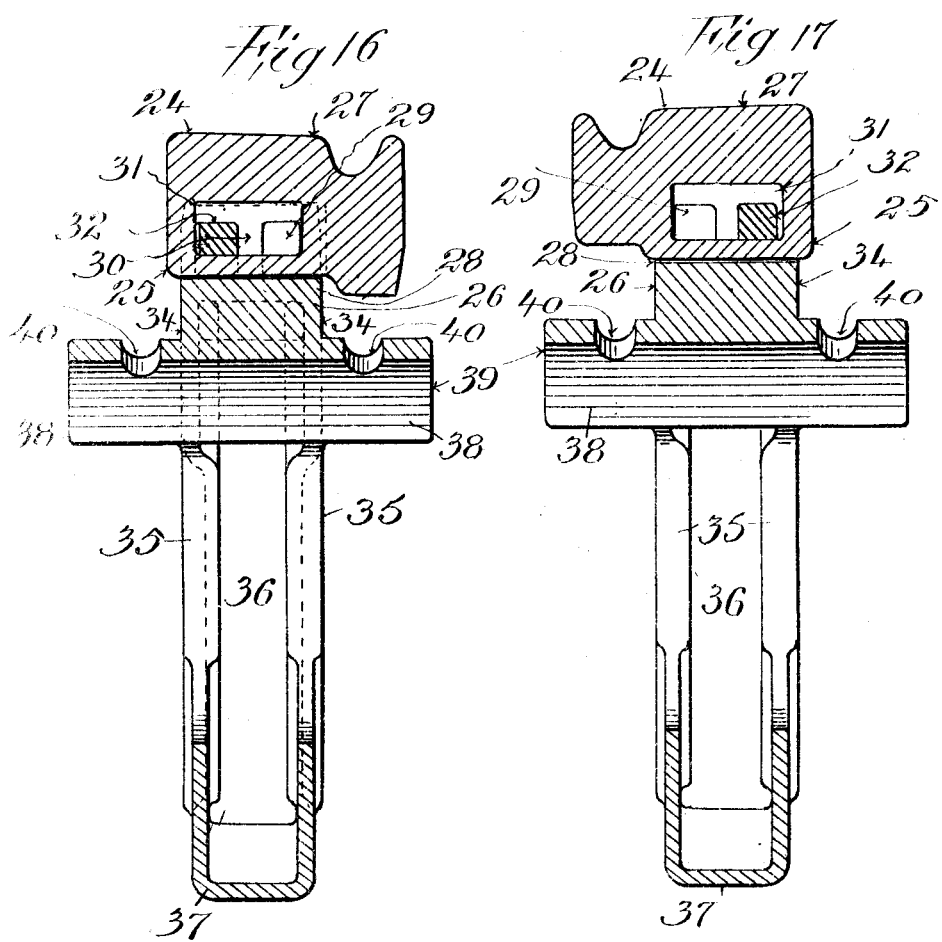

UNITED STATES PATENT OFFICE.

WALTER S. ADAMS, OF PHILADELPHIA, PENNSYLVANIA, ASSIGNOR TO THE J. G. BRILL CO., OF PHILADELPHIA, PENNSYLVANIA, A CORPORATION OF PENNSYLVANIA.

BRAKE MECHANISM.

1,176,263.     Specification of Letters Patent.     Patented Mar. 21, 1916.

Application filed May 5, 1913. Serial No. 765,438.

*To all whom it may concern:*

Be it known that I, WALTER S. ADAMS, a citizen of the United States, and a resident of the city of Philadelphia, county of Philadelphia, and State of Pennsylvania, have invented certain new and useful Improvements in Brake Mechanism, of which the following is a specification.

The object of my invention is to so improve the construction of car truck brake-shoe hangers and their immediately associated parts, particularly their connections with the truck frame and brake-shoe and the operating devices of the brake mechanism, that great flexibility in the accommodation of the hanger to the wheel and shoe-wear and the lengthwise thrust of the axle and wheels or transverse movement of truck frame will be secured with economy and certainty of operation, and without undue wear of parts.

Another object of my invention is to maintain the shoe and wheel faces in parallelism, whereby the shoe and wheel will wear evenly.

An embodiment of my invention, by means of which I secure these and other results, is set forth in the following description.

My invention, therefore resides in the novel construction and combination of parts, and the various equivalent embodiments thereof, as hereinafter set forth.

In the drawing, forming part of this specification: Figure 1 is a side elevation of a portion of a car truck showing my improvements attached thereto; Fig. 2 is an enlarged sectional elevation taken approximately on the line 2—2 of Fig. 1; Fig. 3 is an enlarged sectional elevation taken approximately on the line 3—3 of Fig. 1, looking in the direction of the arrows; Figs. 4, 5 and 6 are respectively plan, side and end views of the hanger head or upper truck casting, to which the upper end of the hanger is secured; Figs. 7 and 8 are respectively side and end views of one of the brake shoe heads; Fig. 9 is a transverse sectional elevation taken approximately on the line 9—9 of Fig. 7, looking in the direction of the arrows; Fig. 10 is a like view taken approximately on the line 10—10 of Fig. 7, looking in the direction of the arrows; Fig. 11 is a sectional elevation enlarged with reference to Fig. 1, taken approximately on the line 11—11 of Fig. 12, looking in the direction of the arrows; Fig. 12 is a like view taken approximately on the line 12—12 of Fig. 11, looking in the direction of the arrows; Fig. 13 is a sectional view of a portion of the live lever, brake head and the parts connecting the same, the section being taken approximately on the line 13—13 of Fig. 14, looking in the direction of the arrows; Fig. 14 is a sectional elevation of the same parts, the section being approximately on the line 14—14 of Fig. 13, looking in the direction of the arrows; and Fig. 15 is a face view of a portion of the brake head, partly in section, the view being taken on the line 15—15 of Fig. 14, looking in the direction of the arrows; Figs. 16 and 17 are respectively enlarged longitudinal sectional views through the brake-head and brake shoe, showing the alternative application of the same to the right and left-hand shoe head.

Similar reference characters designate corresponding parts throughout the several views.

In Fig. 1 I have illustrated a portion of a truck of conventional construction, to which the embodiment of my invention has been applied. Of course, it will be understood that my improvements in no manner relate to the construction of the truck, and any suitable truck can be employed for the support of my brake mechanism. Describing the truck, as shown in Fig. 1, the same consists of wheels 1, side frames 2, transoms 3 to the upper webs 4 of which gusset plates 5 are secured, the gusset plates having flanges 6 secured to the side frames. The gusset plates have slots 7, through which the operating levers, hereinafter to be described, pass. It will be understood that the wheels are provided with axles and journals boxes, that the journal boxes are secured to the side frames and the truck otherwise constructed in conventional or desired manner.

I have shown my improvements with a brake apparatus of conventional construction, and while the same may be modified as desired, it consists of a live lever 8 the upper end of which passes through the slot 7 in the gusset-plate, and which may be connected to the operating brake-rods and release springs in the usual or desired manner.

At 9 is the dead lever. This dead lever is connected to one of the gusset plates by the bracket 10 which is bolted to said gusset plate. Links 11 connect the dead lever and bracket 10, said links being pivoted to the bracket by a pin 12 and to the lever by a pin 13. Instead of forming the live and dead levers substantially straight from end to end, I have provided each one of them with an outwardly bent end 14 and 15 respectively, the bent end 14 of the live lever 8 being connected with the main portion of the lever by a flattened section 16, so as to give this section of the live lever, which has a greater movement than the dead lever, better bearing surface for contact with a compression spring carried by the brake head. The lower ends of the live and dead levers are connected by a conventionally constructed turn-buckle or slack adjusting device comprising the barrels 17, 18, having bifurcated ends, into which the ends 14, and 15 of the live and dead levers enter, the said ends being pivotally connected by pins 19 and 20, the barrels being connected by the threaded rod 21 provided with a nut 22 and jam nuts 23.

The brake mechanism is shown in the released position, and it is of the kind known as the inside hung brake, in which the shoes are supported from the truck frame between the wheels, and are spread outwardly or moved away from each other during their application to the tread of the wheels, and approach each other upon being released. Any of the improvements embodied in this construction may be used in connection with outside hung brake shoes, that is, wherein the brake shoes are hung from the ends of the truck, and which move inwardly upon being applied. If desired, a brake beam may be employed.

My present embodiment is in a pivotal truck. The transoms 3 shown in Fig. 1 are used in connection with the truck bolster.

It is desirable that the hanging for the shoes should have considerable flexibility in its accommodation to the wheel and shoe wear, and the lateral thrust of the axle or transverse movement of the truck frame. It is also desirable that the hanger be provided with means for efficiently taking up wear and preventing rattling and chattering. In prior devices in which these object have been sought, and which are so designed that no undue resistance to the application of the shoe to the wheel or its release would be present, there has been a tendency of the brake shoe to assume a position in which its face is not parallel with that of the tread of the wheel, thereby tending to produce unequal wear of the shoe on the wheel, and lack of maximum efficiency in the operation of the brake apparatus. I believe that the improvements made by me and which will now be described, attain these desired results and avoid the disadvantageous one.

At 24 are shown the brake shoes which are provided with the usual lugs 25. The brake shoe heads 26 are formed with a large front face 27 having a recess 28 for the reception of the lug 25 on the brake shoe. The face 27 under normal conditions bears against the shoe. Back of this face is a suitable pair of recesses 29 separated by a partition 30. The projection 25 is provided with an enlarged perforation 31, a suitable curved key 32 is adapted to pass through one of the perforations 29 and the perforation 31 and thereby locks the brake shoe to the brake shoe head. By providing the two perforations or openings 29 and the enlarged perforation 31, it is possible to always place the key 32 where it will be most effective, that is removed as far as possible from the flange of the wheel to which the brake shoe is applied when the device is in use, and at the same time each head may be used on either side of the truck so that these parts are all interchangeable.

The shoe head immediately back of the part 27 is solid, as at 34, and from this extends two webs 35 forming the channel 36 between them, the webs terminating in a barrel or socket 37. The live and dead levers 8 and 9 extend through the channels 36 formed in each of the brake heads. Above the webs 35 and at the back of the portion 27 is a segmental recess 38 formed partly in the body of the head and partly by the outwardly extending flanges 39, which flanges have slots 40 formed therein. The segmental bearing surface 38 thus formed constitutes part of the flexible or articulated connection of the brake shoe head with the hangers, which are to be described.

For the support of the upper ends of the hangers I employ two castings generically numbered 41 shown enlarged in Figs. 4, 5 and 6. These each comprise a horizontal top web 42 provided with holes 42ª by means of which the casting is secured to a gusset plate 5, as shown in Fig. 1, or to any other appropriate part of the truck structure; a pendant side web 43, and a cross web 44, the cross-web being recessed or segmentally disposed to provide a segmental bearing 45, in which a vertically disposed slot 46 is formed. The bracket also has a strengthening flange 47 following the line of the web 44. These castings or brackets form the upper bearing for the articulated connection of the brake-shoe hanger.

In order to provide for the desired amount of flexibility in the hanging of the shoe, each hanger comprises two links or bars 48.

Many of the advantages derived from the construction of the hangers may be realized by the use of a single link or bar; but I prefer the employment of a pair, arranged or disposed parallel to each other for the following reasons: If a single link is used the shoe head could twist out of true with the wheel tread but two links form a parallel motion and compel the shoe and head to keep true with the wheel tread although the shoe and head can swing sidewise relatively to the truck frame and thus follow the side movement of the wheels and axles in the truck frame. Each link or bar has a strengthening rib 49 on one side which extends substantially between the flat heads 50 of the bar, the opposite faces of the heads being provided with conical lugs or projections 51. At 53 is a bearing block, which has an unbroken segmental surface 54 and an opposite flat face 55. In the flat face is formed a pair of segmental recesses 56, through which extend apertures 57. Between the apertures an inwardly extending segmental recess 58 is formed. This bearing block is inserted in and lies within the recess 38 formed in the rear of the large front face 27 of the brake head 26, the recess being formed in part by the body of the head and the flanges 39. The brake lever, be it either the live or dead levers 8 or 9, (the construction of the brake hanger being the same at both the live and dead lever ends) has secured thereto a knuckle 59 comprising the segmental head 60, flange 61 which bears against the face of the lever, as shown in Figs. 13 and 14 and flanges 62, which embrace the sides of the brake lever and to which the knuckle is secured by bolts or rivets 63. The head 60 of the knuckle is received within the recess 58 in the bearing 53. A spring 64 is inserted in the socket 37 and bears one end against the outer face of the lever, which face or edge might be the flat face 16 of the lever 8 or the edge 65 of the lever 9 (Fig. 1) and the function of this spring is to pull the brake head to the lever with a yielding pressure just sufficient to keep the brake head, bearing 53 and knuckle 59 in yielding frictional contact, so that there will be no lost motion between the parts, all wear therein will be automatically taken up, and the spring 64 will also act to assist the release of the brake shoe from physical or frictional contact with the wheel.

The links or bars 48 are flexibly united respectively to the upper bearings 41. and to the brake head, as follows: At 66 are blocks or separate bearings corresponding in function and in general construction with the bearing blocks 53, they being made separate and spaced apart at the upper ends of the levers 8 and 9 in order to allow the upper ends of these levers to work properly. Each block 66 has a segmental bearing face 67, which bears against the bearing-surface 45 of the bearing-brackets 41, and a conical recess 68 is formed into which the conical lugs 51 enter at the upper end of the links 48. These lugs 51 do not of necessity have to be made conical. They may be cylindrical if desired. At 69 and 70 respectively are bolts having heads 71, 72, threaded ends 73 and 74, carrying set-up and lock-nuts 75, 76 respectively. The bolts 69 serve to secure the links of the hanger bar and its pivotal and flexible connections to the brake shoe holders 26, and the bolts 70 secure these bars to their bearing brackets 41 in a like manner. As before stated, the bearing block 53 is provided with holes 57 and the bearing blocks 66 are likewise provided with holes which pierce them as do the holes 57 pierce the bearing block 53. At 77, 78 are filler blocks, which on their outer faces are provided each with a recess to receive the heads 71 and 72 respectively of the bolts, and at their inner faces they are concaved or made to conform to the segmental configuration of the flanges 39 on the brake head, and the segmental bearing web 44 of the brackets 41. The filler blocks 77 and 78 are apertured and the bolts 69 and 70 respectively pass through them, the slots 40, 46, the bearing blocks 53, 66, the lugs 51, on the links 48, and the links. About each of the bolts are located springs 79, 80, the springs being received within the spring-cups 81, 82, the cups being held against longitudinal displacement by the nuts 75, 76, the cups giving protection to the springs against the influence of external causes. The nuts 75 and 76 provide for adjusting the tension of the springs and the frictional contact of the bearing block and hanger.

It will be seen that the springs at the upper and lower joints of the hangers keep the parts assembled in proper relation under a yielding pressure, thereby preventing rattling and automatically taking up wear. The stresses on the links or the hangers in the act of braking being in the direction of their length, the strain will be transferred to the brackets 41 and brake head through the lugs 51, and bearing blocks 53, 66, where the surfaces are curved and of considerable area, instead of being imposed upon the bolts, whereby shearing strains on the bolts and undue wear of the parts are avoided, the bolts serving mainly for the purpose of keeping their associated parts properly united.

In applying the brakes, the greatest amount of swing is, of course, from the upper pivot, the bearing block 66 moving in its bearing and the filler blocks 77 traveling with the bolt and the bolt moving in the slot unrestrictedly, the parts being, during all this time, flexibly held together by the springs 79, each spring acting independently of the other. The springs 80 at the brake head connection and the parts associated with them perform the same function, as above described, and the frictional resistance set up at that joint serves to maintain the shoe in the position in which it has been set, thereby preventing any undue tilting of the shoe upon its pivot, and insuring a substantial concentricity between the shoe face and wheel tread at the time of the application of the brakes.

It is apparent that the connections of the hanger and the brake head afford an accessible and handy means for adjusting the brake head on its pivot, when occasion requires, in order to insure the concentric application of the shoe to the wheel. The links 48 are also adapted to swing bodily upon their pivots transversely of the truck and with a parallel motion. These pivots are the bolts 69, 70, and the bearings of the lugs 51, 52 in the bearing blocks 53, 66. This lateral swinging motion may be brought about by a relative movement between the wheels and axle and the truck frame, which is mainly evidenced in the operation of the truck in entering or leaving curves. The flexible joints of the hanger furthermore provide efficient means for maintaining the hangers and shoes at the angles at which they are set or hung during the time that the truck may be ascending or descending grades, thereby avoiding any inadvertent frictional contact by the shoes with the wheels.

A common trouble with many forms of brake hangers is that they permit a twisting of the brake shoe, that is one part of the brake-shoe comes partially in contact with a wheel before the rest of the shoe so that the shoe becomes unduly worn in a small part of its braking surface and does not wear evenly nor does it wear the tread of the wheel properly. Such a result is not likely to occur with the structure made as above described when the same operates under the normal condition. The two parallel hangers always force the brake shoe to swing true in any direction and with a parallel movement against the tread of the wheel as above described. Twisting would require the lower end of one link to swing in advance of its companion link which cannot take place as explained here.

It is apparent that many modifications may be made in the construction and arrangement of the parts comprising the hereinbefore described embodiment of my invention without departing from the spirit of the same.

I claim:

1. In a brake mechanism, the combination with a brake shoe, a head for the same, a brake lever, means interposed between the brake lever and the brake shoe head for pivotally connecting them, and means carried by the brake shoe head for yieldingly uniting said lever and the brake head.

2. In a brake mechanism, the combination with a brake shoe head, a brake lever, a pivotal bearing between the lever and head and a spring engaging the brake lever for yieldingly uniting the brake lever and brake shoe head.

3. In a brake mechanism, brake shoes, brake heads to which said shoes are attached, brake levers resiliently secured to said brake shoe heads, pivots on said brake levers, a truck frame, hanger supports on said frame, pivots extended laterally from the brake shoe heads, laterally extending pivots on the hanger supports, and brake hangers extending between the pivots on the shoe heads and the pivots on the hanger supports.

4. In a brake mechanism, brake heads, a brake lever, a segmental bearing block with a segmental recess therein secured to the brake head, a knuckle moving in said recess in the bearing block and pivotally connecting the brake lever and brake head, a truck frame, hanger supports on the truck frame, bearings on the brake shoe head, bearings on the hanger supports and a pair of hangers for each head connecting said bearings.

5. In a brake mechanism, brake shoe heads, an upper support, bearings in said upper support, brake hanger rods and means connecting said rods and said supports so that said rods may swing freely a limited amount in any direction, and means connecting said head with said rods so that when said rods swing the said head will always swing with a parallel movement.

6. In a brake mechanism, a bracket, a brake shoe head, a pair of hanger rods connecting said bracket and head and connections between said rods and said bracket and head so that said head may swing a limited amount in any direction with a parallel movement.

7. In a brake mechanism, a hanger having projections near each end and perforations through said projections, bearing blocks engaging each of said projections, said bearing blocks having suitable perforations in line with the perforations of said rods, seats with slotted openings for said bearing blocks, filler blocks adjacent to said slots and bolts passing through said perforations, filler blocks and slots.

8. In a brake mechanism, a hanger rod with integral projections and perforations through said projections, said perforations and projections being located near each end thereof, recessed bearing blocks adapted to engage said projections and perforations through said bearing blocks in line with the perforations in said projections, slotted seats for said bearing blocks, filler blocks with perforations adapted to register with the slots in said seats, and also with said perforations, bolts passing through said filler blocks, slots, blocks and hanger projections and springs on said bolts so arranged and disposed as to keep said parts in proper frictional contact one with another.

9. In a brake mechanism, a brake shoe head, a brake lever, a spring engaging said lever for yieldingly uniting the same and the brake shoe head, and a pivotal bearing connecting the brake lever and brake shoe head.

10. In a truck brake mechanism, a seat for a bearing block, a pair of hangers, and a bearing block connecting said seat and hangers, said bearing block having one surface adapted to fit said seat and permit the hangers to swing longitudinally of the truck, projections on said hangers, and seats in said bearing block for said projections so that said hangers may swing transversely of the truck, and two resilient means for holding said seats, block and hangers in proper relation.

11. In a brake mechanism, a pair of hangers provided with projections near each end and perforations extending through said projections, two bearing blocks one at each end of said hangers, a bolt passing through each of said perforations to secure the hangers and blocks together, and means for supporting one of said bearing blocks so that the same can swing about its longitudinal axis for a limited distance so that said hangers may swing both longitudinally and transversely of the truck.

12. In a brake mechanism, a brake shoe head having two parallel webs, one end of each of said webs being united to the other by parts forming a cup for a spring and the other ends of said webs being united by a crossing forming a seat for a bearing.

13. In a brake mechanism, a brake shoe head having projecting webs united at their outer ends by a suitable integral cap whereby a spring seat is formed, and a cylindrical web uniting their inner ends whereby concave and convex bearings are formed on said last mentioned web.

14. In a brake mechanism, a brake shoe head having a plurality of webs forming a channel between them, a connection between the outer ends of said webs forming a cup, a lever, a spring in said cup pressing against said lever, and means connecting said brake shoe head and lever with a flexible connection.

15. In a brake mechanism, a brake shoe head having a pair of webs united at their outer ends by parts forming a seat for a spring, and near their inner ends a suitable seat for a bearing block, a bearing block in said seat, a lever with a knuckle secured thereto adapted to engage said bearing block, and a spring in said seat adapted to press said lever so as to force said knuckle into engagement with said bearing block.

16. In a brake mechanism, a brake shoe, a brake shoe head, a brake lever, means for pivotally connecting said brake lever and brake shoe head and for yieldingly uniting said lever and the brake shoe head.

Signed at the city of Philadelphia, county of Philadelphia, and State of Pennsylvania, this 1st day of May 1913.

WALTER S. ADAMS.

Witnesses:
HENRY C. ESLING,
H. F. McKILLIP.